(12) United States Patent
Kahn et al.

(10) Patent No.: US 7,365,771 B2
(45) Date of Patent: Apr. 29, 2008

(54) CAMERA WITH VISIBLE AND INFRA-RED IMAGING

(75) Inventors: Richard Oliver Kahn, Oakland, CA (US); Stephen Philip Cheatle, Bristol (GB); David Arthur Grosvenor, Bristol (GB); David Neil Slatter, Bristol (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 10/107,803

(22) Filed: Mar. 28, 2002

(65) Prior Publication Data

US 2002/0140822 A1 Oct. 3, 2002

(30) Foreign Application Priority Data

Mar. 28, 2001 (GB) ................... 0107795.7

(51) Int. Cl.
*H04N 5/225* (2006.01)
(52) U.S. Cl. .................. 348/207.99; 348/164
(58) Field of Classification Search ............ 348/164, 348/207.99; 382/116
See application file for complete search history.

(56) References Cited

U.S. PATENT DOCUMENTS

| | | | |
|---|---|---|---|
| 4,118,733 A | | 10/1978 | Sarson et al. |
| 4,608,599 A | * | 8/1986 | Kaneko et al. ............ 348/164 |
| 4,679,068 A | | 7/1987 | Lillquist et al. |
| 4,751,571 A | | 6/1988 | Lillquist |
| 5,107,333 A | | 4/1992 | Poque et al. |
| 5,550,928 A | | 8/1996 | Lu et al. |
| 5,576,838 A | | 11/1996 | Renie |
| 5,655,053 A | | 8/1997 | Renie |
| 5,694,514 A | * | 12/1997 | Evans et al. ................ 386/46 |
| 5,801,373 A | | 9/1998 | Oozu et al. |
| 5,844,599 A | | 12/1998 | Hildin |
| 5,965,875 A | | 10/1999 | Merrill |
| 6,507,366 B1 | * | 1/2003 | Lee ............................ 348/352 |
| 6,526,158 B1 | * | 2/2003 | Goldberg .................... 382/115 |
| 6,801,637 B2 | * | 10/2004 | Voronka et al. ............ 382/103 |
| 2001/0046316 A1 | * | 11/2001 | Miyano et al. ............. 382/154 |
| 2003/0001846 A1 | * | 1/2003 | Davis et al. ................ 345/474 |

FOREIGN PATENT DOCUMENTS

| | | |
|---|---|---|
| EP | 0343634 A2 | 11/1989 |
| EP | 0 504 023 A1 | 3/1992 |
| EP | 0 660 131 | 6/1995 |
| EP | 0-813-073 | * 12/1997 |
| EP | 0813073 A2 | 12/1997 |
| EP | 0 953 935 | 11/1999 |
| FR | 2 687 000 | 8/1993 |

(Continued)

*Primary Examiner*—Lin Ye
*Assistant Examiner*—Anthony J Daniels (57) ABSTRACT

A digital camera derives an infrared and visible signals from IR and visible sensors. The sensor fields of view overlap or share a common field of view. An analyzer of the IR signal provides the location of and information from an active or passive IR target. The analyzer responds to the location and information signals for visible image composition control (pan/tilt/zoom/timing) and selection of visible image pictures for storage to provide ancillary information, such as personal details of a target wearer. The visible and infrared image signals are combined to correct for sensitivity of the visible and/or IR sensors to IR and visible wavelengths, respectively.

31 Claims, 4 Drawing Sheets

FOREIGN PATENT DOCUMENTS

| | | |
|---|---|---|
| GB | 2 143 397 A | 2/1985 |
| GB | 2307816 A | 6/1997 |
| GB | 2 312 585 A | 10/1997 |
| WO | 89/12941 | 12/1989 |
| WO | WO 90/05426 | 5/1990 |
| WO | WO 98/10358 | 3/1998 |
| WO | WO 00/04711 | 1/2000 |

\* cited by examiner

CAMERA WITH VISIBLE AND INFRA-RED IMAGING

RELATED APPLICATIONS

The present application is based on, and claims priority from, United Kingdom Application No. 0107795.7, filed Mar. 28, 2001, the disclosure of which is hereby incorporated by reference herein in its entirety.

The present invention relates to a camera provided with sensors for providing respective images in the visible and infra-red regions of the spectrum for the same field of view. It also relates to uses to which such a camera can be put.

It is often advantageous to impose automatic or semi-automatic control on one or more video or still cameras. For example, continuous control of pan and tilt, and where possible, zoom, allows a camera to track an object once it has been identified in the field of view, and permits the object to be tracked between one camera and another. This has clear potential in applications such as security installations; the televising of sporting and other like events; and the reduction of the number of necessary personnel in a studio, for example where a presenter is free to move.

In another application of automated imaging, still or video images are captured of people moving within a fixed framework and along generally predetermined paths. For example, visitors to a funfair may have their pictures taken when they reach a predetermined point in a ride.

However, automation also brings with it a number of related problems. The functions of the absent camera operator, for example knowing which target to image and controlling pan/tilt/zoom, framing and composition accordingly, together in certain cases with transmission of the images to the correct location, need effectively to be replaced by automated means, and recently there has been interest in the use of tags for at least some of these ends.

Thus in International Patent Application No. WO 00/04711 (Imageid) there are described a number of systems for photographing a person at a gathering such as a banquet or amusement park in which the person wears an identification tag that can be read by directly by the camera or by associated apparatus receiving an image signal from the camera signal or from a scanner if the original image is on film. In these systems, the tag can take the form of a multiple segmented circular badge, each segment being of a selected colour to enable identification of die badge as such, and to enable identification of the wearer. Identification of the wearer enables the image, or a message that the image exists, to be addresses to the correct person, e.g. via the Internet. Disadvantages of the use of a visible spatially coded tag are that it can be obtrusive in the final image, and that if it is too distant its detail will be difficult to resolve. This applies irrespective of whether the tag is passive as in the aforementioned disclosure, or an active spatially coded light emitter. An advantage is that a passive tag has no operating power requirements.

International Patent Application No. WO 98/10358 (Goldberg) describes a system for obtaining personal images at a public venue such as a theme park, using still or video cameras which are fixed or travel along a predetermined path. An identification tag is attached to each patron for decoding by readers at camera sites, although camera actuation may be induced by some other event such as a car crossing an infra-red beam or actuating a switch. The tag information is also used for image retrieval of that patron. The tag may be, for example a radio or sound emitter, an LED (including infra-red), or comprise a bar code or text. Alternatively, techniques such as face recognition or iris scanning could replace the tag. Similar types of system are described in U.S. Pat. Nos. 5,694,514 (Lucent); and 5,655,053 and 5,576,838 (both Renievision). A camera system with image recognition is also described in U.S. Pat. No. 5,550,928.

In these systems, the tag is used principally for activation of the camera and for coded identification of the target within the viewed image.

European Patent Application No. 0 953 935 (Eastman Kodak) relates to an automatic camera system in which a selected video clip is made into a lenticular image.

European Patent Application No. 0 660 131 (Osen) describes a camera system for use at shows such as an airshow, a sporting event, or racing, where the position of the target is provided by a GPS system and used to point the camera correctly.

In U.S. Pat. No. 5,844,599 (Lucent) is described a voice following video system for capturing a view of an active speaker, for example at a conference. A voice activated tag detects when a person is speaking and emits infra-red radiation identifying the speaker, thus enabling a controller to operate a camera so as to pan/tilt/zoom from the previous speaker, or to move from a view of the entire assembly. In an automatic mode, the controller includes means for detecting the position of the infra-red emitter using optical triangulation, and there may additionally be provided means for analysing the camera output to locate the speaker's head and shoulders for further adjustments of the field of view. In this system, the tag identifies itself to the camera when it is necessary to view its wearer, but provides no information peculiar to the wearer. The camera is controlled according to tag activation and the position of the activated tag. There is no patterning or other spatial coding of the tag.

The requirements for video imaging of a speaker at a conference, where the participants are all present within a limited framework, and where it is unnecessary to identify individual participants, are rather different from those pertaining in many other potential automated camera locations, such as a theme park or other public event where it is not known in advance who will be present or what they will be doing at any time.

A disadvantage of tagging techniques such as radio and sound emission is that the physical location of an emitting tag may be difficult to determine, particularly where reflections of the radiated energy occur from nearby objects. Furthermore, detectors which operate independently of the camera are required, and if these are significantly spaced from the camera, there may be problems associated with parallax, where the filed viewed by the camera differs from that viewed by the tag detector. As previously mentioned, the use of tags such as bar codes which are readable in the visible part of the spectrum means that the tag must be picked out from the pictorial background by virtue of its pattern and/or shape. Not only might this be difficult under certain circumstances, but the tag appears as a visible object in the resulting picture, at least before being edited out.

The foregoing prior art relates generally to cameras which are fixed, or fixed relative to a moving platform the location of which can be ascertained. However, tags in a scene may also be useful in conjunction with cameras which are hand-held or worn (for example as a badge or as part of a headset or spectacles), and this use may be facilitated by the present invention, particularly in cases where the tag is read by the camera itself, since an important factor is commonly the relative location of the tag to the camera rather than its absolute location.

The present invention enables the use of a tag, which is hereafter regarded as part of a more general class of target, which is readable in the infra-red part of the spectrum. The target may be spatially coded or temporally modulated to provide further information. The visible appearance of the target may be such as to blend in with the viewed image.

In use of the invention, information from the target may be used to provide, or to provide access to, further information, e.g. to identify a wearer or other object of interest, to provide further information or a pointer thereto, or to provide camera operating instructions. For example a target adjacent an exhibit may provide a pointer to a computer or web file containing further information about the exhibit or the site where the exhibit is located. The pointer or information may be combined with the image information in any known manner. In particular, it is possible to produce a composite image signal in which the pointer information is embedded in or underlies the image in much the same way as a web or windows page is composed, so that clicking on a local "hot-spot" will access information defined by the pointer.

Additionally, or alternatively, information from the target may be used to provide camera operating instructions, such as an indication of rules for determining the composition of a picture before it is taken (either as a still or video clip), or the number of pictures (or length of video clip) to be taken on any one occasion, or whether the target needs to be associated with, or exclude, any other targets in the picture to be taken. Such matters are covered in more detail in our copending patent application (ref: 30002418/P21317GB).

The present invention also enables digital images to be corrected for unwanted responses of visible light sensors to infra-red radiation.

In a first aspect the present invention provides camera apparatus comprising a digital camera arranged to provide a first image signal corresponding to an infra-red field of view and a second image signal corresponding to a visible field of view, wherein said visible and infra-red fields of view overlap or share a common field of view, and said apparatus includes means for analysing said first signal for detecting and determining the location of an infra-red target within its field of view.

While the infra-red and visible fields of view may be substantially coextensive, other arrangements are possible, for example where the visible field of view lies within the infra-red field of view. This could be useful for capturing a target which may not fall within the field of the visible image.

While the first and second image signals could be provided by separate cameras (or a twin lens camera) arranged or controlled so that the field of view for the infra-red and visible images overlap, preferably light through the same camera lens is used to provide both signals, and in either case, the first and second image signals may be provided by respective separate first and second image sensors. Preferably the first image sensor comprises a first sensor element array and the second image sensor comprises one or more second sensor element arrays.

Where a single main camera lens or other focussing means is employed, light from the field of view may be directed to the first and second image sensors by a beam splitter, and if the beam splitter or sensors do not possess the appropriate wavelength selective properties the second image sensor may be provided with a filter or filters for directing visible light thereto, with the first image sensor being provided with a filter for selectively directing infra-red light thereto, as appropriate. An advantage of arrangements with separate sensors is that both the visible image and the infra-red images may be brought to a precise focus on their respective sensors, by mechanical alignment or by use of a supplementary lens.

Alternatively, a single camera may comprise a composite sensor element array, formed by combining sensor element arrays for the first and second signals, e.g. by regular intercalation of one with the other(s) to provide a sensor mosaic or stripe array. In this case, the elements of the arrays may be provided with visible (or colour component) and infra-red filters as appropriate. A disadvantage may be that the infra-red image is somewhat out of focus on the array when the visible image is in focus.

In a further option, the camera may comprise a single sensor (e.g. a sensor element array) together with at least one visible and one infra-red filter, and means for switching or placing the filters before the sensor in sequence to provide the first and second image signals.

The second signal may or may not include colour information. Where it does, it may comprise multiple colour component information, either simultaneously (for example as provided by a colour filter mosaic or stripe array) or sequentially (for example by the used of sequentially switched colour filters for the whole sensor), as outlined in somewhat more detail below.

In one embodiment of camera according to the invention, the number of infra-red responsive elements of a sensor array is substantially equal to the number of visible light responsive elements (or, for colour, to the number of elements for responding to one colour component of the image, or to the effective number of colour pixels). This can permit spatial details to be more easily resolved, e.g. of an infra-red target which is coded as by a bar code.

In any of the foregoing arrangements the camera may be provided with means for selectively restricting the effective area of a sensor, i.e. the number of infra-red responsive elements which are scanned if it is an array, so to control its relative field of view. When this is done in respect of the infra-red image, the frame scanning rate for the infra-red signal may be substantially increased relative to the rate when scanning all the sensor elements. The restricted area may be controlled so as to include a selected target, for example an infra-red target, and it may be restricted merely to the area of such target for reading it, but it is preferably sufficiently large also to enable tracking of the target with relative camera movement. The increased frame scanning rate may be at least 300Hz, preferably at least 500 Hz, more preferably at least 1 KHz, even more preferably at least 2 KHz, and most preferably at least 4 KHz.

In another embodiment of camera according to the invention, the number of infra-red responsive elements may be substantially less than the number of visible light responsive elements or to the number of elements for responding to one colour component of the image, i.e. less than the effective number of pixel elements of the visible image, where a pixel element may include plural elements for responding to different colours. In one embodiment based on am RGB mosaic, this may be accomplished by regular replacement, at a relatively low density (say between 1 in 10 and 1 in 40) of the blue B elements to which component the human eye is least sensitive. The frame scanning rate for the infra-red signal may be substantially greater than the frame scanning rate for the visible image or a colour component of the visible image. The infra-red frame scanning rate may be at least 300Hz, preferably at least 500 Hz, more preferably at least 1 KHz, even more preferably at least 2 KHz, and most preferably at least 4 KHz.

The camera may be used use with a tag or target which emits modulated infra-red light bearing information, being provided with means for responding to said modulated light to provide an information signal. Such a target may be secured to a person at an exhibition or show, for example, or secured to an exhibit. Alternatively a modulated infra-red emissive pointer may be used to identify some object which the user wishes to image.

Additionally or alternatively the camera may be useful with a target which bears information in the form of an infra-red light pattern or coding, being provided with means for responding to said pattern or coding to provide an information signal. This includes the case where the target is not per se an emitter, but relies on ambient IR light, e.g. provided by a separate IR source. The latter may be located at a predetermined position relative to the camera. It may be modulated to distinguish it from other IR light sources.

At least part of the information signal may provide an address or other identifier relating to the target or pointer user, for example a name from a guest list, a mail address, or an e-mail address; or other information useful to the user, for example a web address or a link. It may be combined with the second signal to provide an output signal. In one particular embodiment, the combination is such as to provide the type of composite image signal occurring in a window or web page, where the image signal is accompanies by a corresponding underlying map. When a cursor traverses a predetermined area associated with the information signal, for example an identifiable object in the actual image, or an icon placed into the image, its shape may change and clicking on the cursor position enables the information to be accesses in known manner.

The link or web address may be to a local or remote database for providing further information, and may, per se, only provide some form of identification of the target. The database may then or subsequently provide means for correlating the link with other information such as those exemplified in the previous paragraph.

Additionally or alternatively, the information signal may include instructions for camera control. For example, the instructions of a target worn by a person may specify that a picture is to be taken only when a predetermined number of targets of people common to a group are in the field of view; or that a picture is to be taken in response to some event such as the noise of a laugh, or a particular action; or that multiple pictures are to be taken; or that a picture is only to be taken when an auxiliary signal is provided by the wearer in addition to the target signal. Some of these instructions might be more pertinent where the camera is part of a fixed installation.

To enable effective picture taking and to reduce the number of unwanted pictures, adaptive image signal responsive means may be provided for receiving and analysing an image signal, preferably the second image signal, and for controlling the camera in response thereto, for example for physical control at least one of camera pan, tilt, zoom; for electronic control of timing of operation of the camera or the scanned area of the visible array (equivalent to control of pan, tilt and/or zoom) to improve picture composition. It may additionally or alternatively control the selection of a selected picture signal from the said image signal, e.g. to select an area of the image represented thereby, and/or to select an image from a sequence. The adaptive image signal responsive means may act on the visible image signal to analyse the principal features, and to make decisions regarding automatic cropping, the (effective) precise direction of the camera, and to detect events such as the occurrence of a smile for timing of image exposure.

Alternatively or additionally, a camera according to the invention may include means for analysing the first signal for determining the location of an infra-red target (tag) within its field of view, and there may be means for responding to the target location for controlling at least one of camera tilt, pan and zoom. Where the adaptive image responsive means is also present there may be conjoint control of the camera in response to the image signal and target location.

Conjoint control may be useful for example where automatic cropping is provided, and where it is necessary to ensure that the cropped region has a predetermined relation to the target. For instance the target may worn by one person in a group, and it is desired to crop to a close-up of the wearer's face and not to a different face. By locating the target in the field of view and identifying bodies in a segmented version of the image, it may be possible to identify the body of the wearer and so to distinguish the wearer's head from others, to permit the correct cropping action.

The necessary intelligent circuitry for effecting at least some of the above operations may be located at or within the camera. However, where the camera is part of an installation comprising a plurality of fixed cameras, and particularly where the second signals are sent to a common computing and storage facility, at least some of the intelligent circuitry is preferably located at such facility. This applies especially to any adaptive image signal responsive means. The first image signal could be likewise processed at the facility, or where only camera control instructions arise therefrom, at the camera itself.

Where fixed camera has pan tilt and/or zoom controls it may not be able immediately to detect the presence of a target if it is not set correctly. Such a camera may be provided with means for causing the camera to be scanned over its maximum area of cover until it detects the presence of a target. It may also be provided with means for continuing the scan once it has responded to the presence of a particular target, and for thereafter ignoring that target.

In a variation, the infra-red target may comprise a transponder, e.g. an ultrasonic or rf transponder, the camera being provided with means for interrogating the transponder of any target in the immediate environment and for receiving a response from the transponder. This can be used to cause the camera to perform a search for the target, and/or to cause the camera to be pointed in the general direction of the target, particularly useful if the camera field of view is relatively narrow.

A particular problem with having a target which is continually active, even if operated only periodically, is that there is a continuous power drain, and in some circumstances the wearer may assume that is still operative when in fact this is not the case. The infra-red emitting target may therefore be arranged to have a low power "sleep" state in which it requires a "wake-up" signal before transmitting light, and the camera, where power considerations may be less important, may be provided with means for emitting a said "wake-up" signal to any target in the vicinity.

While the description of the prior art has concentrated on the use of automatically operated cameras, it should be noted that a camera according to the invention may include means for combining the infra-red image information from the first array with the signal from the second array for correcting for sensitivity of the second array to infra-red light. This is useful where relatively high faithfulness of colour rendition is required, since it is known that colour filters (including wavelength selective beamsplitters) do not ordinarily possess the characteristics required for perfect waveband separation, and is particularly useful in cases where the filters would otherwise permit some infra-red energy to penetrate to the sensor element arrays.

It is known from International Patent No. WO 8912941 (Hame) to produce a false colour image from sensor responsive to IR, (IR+G) and (IR+R) components of a viewed image. However, in this case, there is no image signal substantially corresponding to visible components of a field of view, only the R and G signal deliberately combined with an IR signal. Furthermore no correction is performed on any visible signal to reduce the IR contribution.

In many embodiments of the invention, particularly those where a beam splitter is employed with a common lens to provide both visible and infra-red images, it will prove most convenient to provide an infra-red field of view which corresponding substantially to, i.e. is coextensive with the visible image field of view. However, the fields need not be coextensive, provided there is a common field of view. This includes cases where the visible field completely embraces the infra-red field, or vice versa, and cases where the fields overlap, sharing a common field but retaining a further regions peculiar to the visible and infra-red field respectively.

Control of the relative fields of view can simply be accomplished by the use of a separate infra-red and visible cameras, or by the use of a single camera with beamsplitter and additional optics. Alternatively, such control could be accomplished by the spatial arrangement of visible and infra-red sensors, e.g. in the form of arrays and regardless of whether the arrays are separate or form a composite array, or by controlling the scanning of such sensors. While the visible field could extend beyond the infra-red field, by including it or merely overlapping it, in particular it is possible to provide an infra-red image signal of a field of view which is significantly greater than and includes that of the visible image. The latter arrangement may be advantageous for detecting an infra-red target lying beyond the visible image, so that by suitable control of the camera apparatus the target may be brought into the visible field.

Further details and advantages of the present invention will become apparent upon consideration of the appended claims, to which the reader is referred, and upon a reading of the following more detailed exemplary description, in which:

Figure 1:
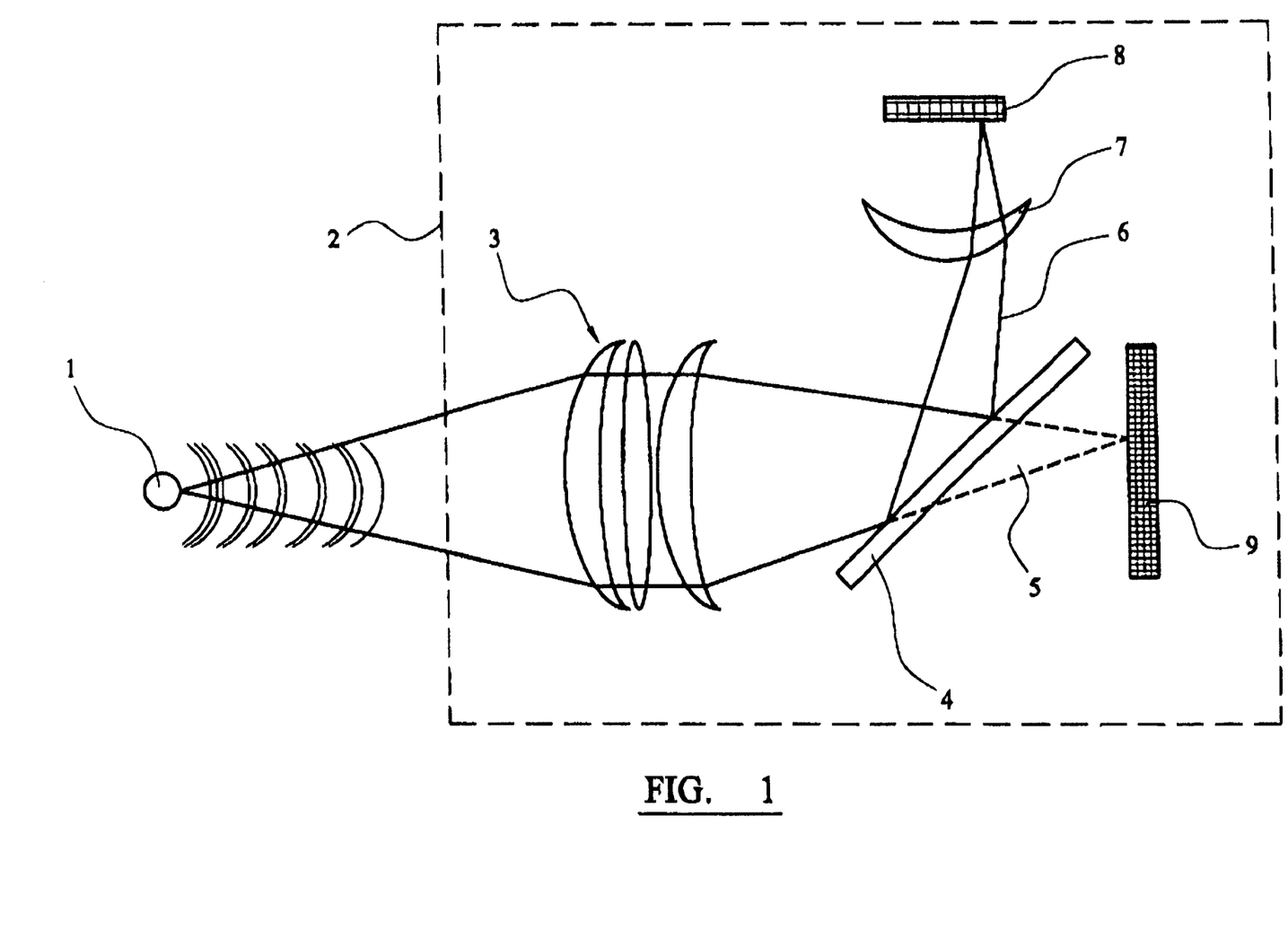
FIG. 1 shows in schematic form an embodiment of camera apparatus according to the invention as used for detecting an infra-red emitting target.

In FIG. 1, the target 1 comprises an infra-red diode 1 which transmits an information signal modulated on a 2 KHz carrier. The camera 2 comprises a group of lenses 3 followed by a beam splitter 4 which transmits visible light 5 to a conventional CCD or CMOS sensor array 9 sensitive to visible light. The infra-red component 6 of the incoming image is reflected by mirror 4 via an infra-red image reducing lens 7 onto an infra-red sensor array 8.

The array 8 is arranged so that its field of view is substantially the same as the array 9, but it comprises significantly fewer sensor pixels so that its resolution is much lower. This means that while the array 9 needs to be scanned at conventional frame rates, say of 15 to 30 frames per second, the array 8 can be scanned sufficiently fast not only to detect the beacon 1 but to permit decoding of the information signal modulated thereon.

In one application of the camera 2, where it is part of a fixed installation at a theme park, the target is worn by a visitor. The information in the information signal is in a format which provides (a) ancillary information such as the identity and/or address (mail/e-mail, etc.) of the visitor, and additionally allows for (b) camera exposure information to be included such as whether the wearer is part of a group (and if so the number of people in the group), thereby to enable the intelligent composition and timing of group pictures; whether a picture should be taken immediately, or after a delay, or, for example, in response to an event such as a noise (e.g. laughter) or a movement (sudden, or a predetermined type of gesture, or a smile or other facial expression), again to improve on composition; whether multiple exposures are required; and, if necessary, details of encryption protocols for privacy. The information signal could also be encoded for security.

However, in addition to this type of information, the presence of the infra-red image as detected by the array 8 enables relatively precise location of the target, and this, in turn can lead to automatic camera control, for example pan and tilt, and zoom where available (for example using an autofocus mechanism for ranging).

Figure 2:
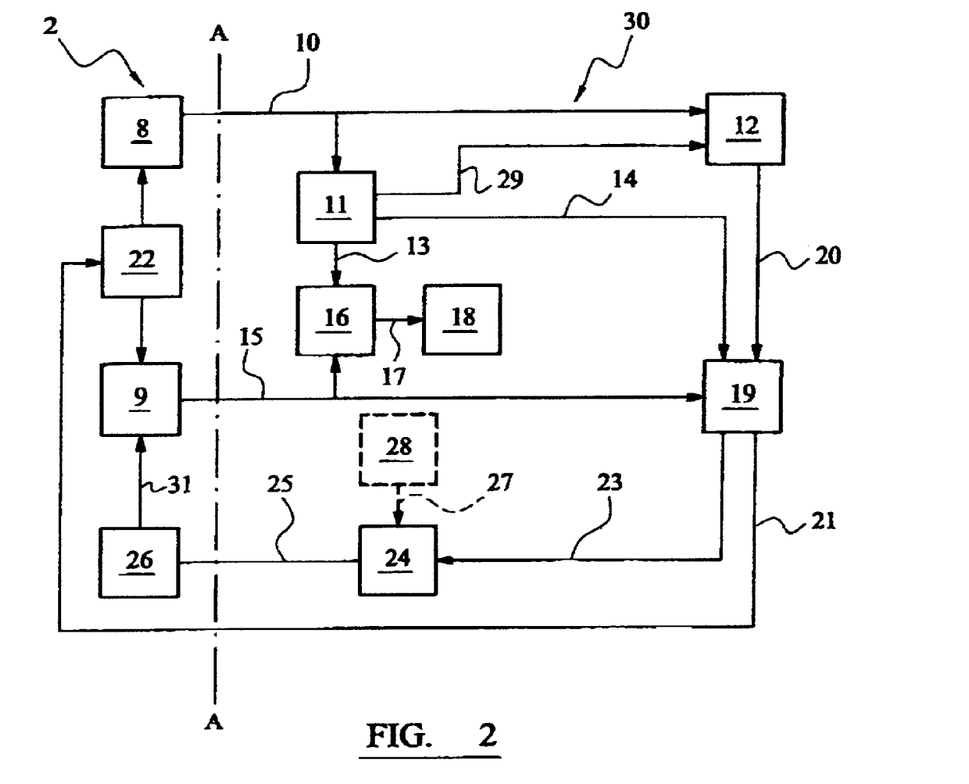
FIG. 2 shows in schematic block diagram form the circuitry of the embodiment of FIG. 1, and of a variant in which part of the circuitry is included in a central processing facility.

A typical arrangement is exemplified in FIG. 2, where the first image signal 10 from the sensor array 8 is passed to a decoding circuit 11 in which the 2 kHz information signal is detected, extracted and demodulated, and to an analysis circuit 12 in which the location of the target is determined to provide a location output signal 20. The circuit 12 is enabled in response to a target detection signal 29 output from circuit 11.

Depending on the format of the information signal, the decoding circuit 11 may also act to decrypt the information signal, and as shown, it further breaks the resulting information into the aforesaid ancillary information (a) as an ancillary information signal 13, and the aforesaid camera exposure information (b) as a picture control signal 14.

The ancillary information signal 13 and the visible image output 15 from the second sensor 9 are fed to a combiner circuit 16 where they are combined in a manner known per se to provide a composite signal output 17 for storage in a memory 18. At a later time, the stored ancillary information may be employed to identify stored pictures relating to the same target, or to communicate the stored pictures to the target wearer, for example.

The location signal 20 from the analysis circuit 12, the visible image output 15 from the second sensor 9 and the control signal 14 are coupled to an image analysis and decision circuit 19. In response thereto, the circuit 19 provides a camera setting control signal 21 to camera setting servo device(s) 22 for adjusting at least one of pan, tilt and zoom, and preferably all three according to a desired picture format represented by picture control signal 14. It also judges when an acceptable picture is being presented, and provides an exposure control signal 23 to a timing circuit 24, the output 25 of which is coupled to a scan control circuit 26 with an output 31 controlling the scanning of sensor 9, e.g. for gating the scan on to record a picture or video sequence. The gating output 31 effectively selects when a picture is to be taken and recorded, and could be applied elsewhere, for example in the path of signal 15 or signal 17, or to an enable circuit controlling memory 18.

The timing circuit may have inputs 27 from one or more ancillary devices, for example a microphone 28 (shown dotted), which will be combined (for example logically combined) with the signal 23 for providing the output 25. Thus a picture might be taken when circuit 19 recognises an acceptable composition, or when a particular noise is detected by microphone 28.

The signal 14 may provide a number of functions. For example it may dictate to image analysis and decision circuit 19 what type of composition is required, e.g. group or single person; how many exposures should be taken; or, for a video sequence, the length of the sequence, which may control the duration of exposure control signal 23.

Image analysis following a predetermined set of rules can lead to a decision as to where the important part of the image is located. This will normally be a part of the image associated directly with the target location, although in certain cases the link may be somewhat indirect (for example locating a person's body bearing a target by means of circuit 19 on the basis of signals 15 and 20; determining the associated facial position by image analysis in circuit 19; and taking a close-up of the face only as required by signal 14, with conjoint control of zoom by the signal 21). The use of segmentation of the image (decomposing it into broad blocks which might be assumed to relate to the same feature), together with an assessment of the characteristics of the segmented image including the spatial relationship between one segment with another and with the overall picture shape, can lead to a more precise determination of how the camera pan/tilt/zoom should be set.

It will be understood therefore that the target 1 can serve the function of providing coded information both for identifying a subject to be imaged and for defining the requirements associated therewith and that this may involve control of camera settings and exposure, and the provision of a composite picture signal bearing at least some of the ancillary information.

All of the elements shown in FIG. 2 may be provided within the camera 2, but particularly for a fixed installation it may be more convenient to send the visible and infra-red image signals 15, 10 back to a central processing and storage facility 30, where decisions are made on the basis thereof for producing control signals such as 21 and 25 which are transmitted back to the camera 2. This is illustrated in FIG. 2 by the dashed line A-A, camera elements being to the left of the line and elements for the central facility being to the right. Clearly, other divisions of the elements between the camera 2 and the central facility 30 are possible.

Figure 3:
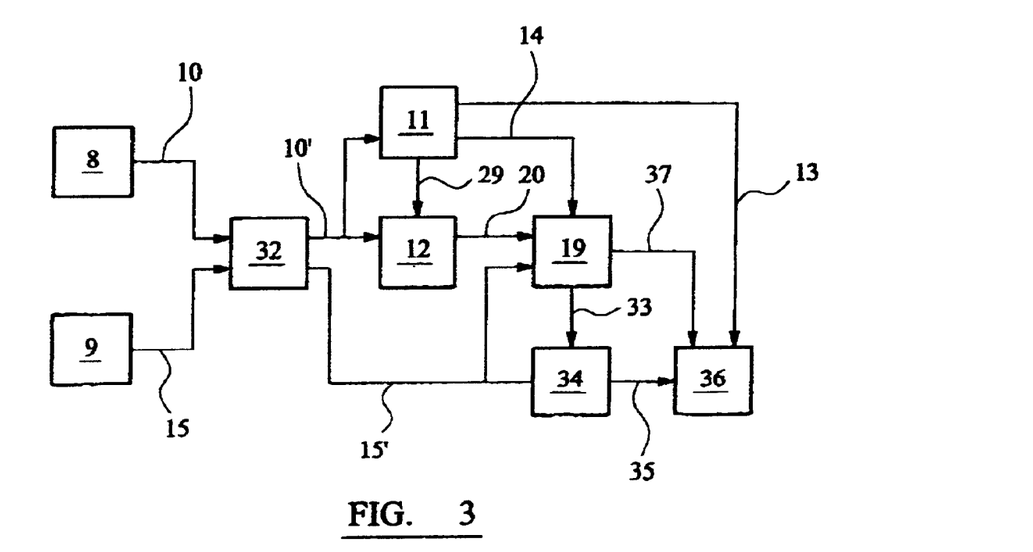
FIG. 3 shows in schematic block diagram form the circuitry of a second embodiment of the invention.

FIG. 3 illustrates an embodiment for the same type of active target 1 in which the sensors 8, 9 are fixed sensors covering a wide angle of view, their outputs 10, 15 being continuously recorded in a store 32, either in the camera or at a remote location. At a later time, replayed signals 10', 15' are supplied to a decoding circuit 11 which provides a demodulated ancillary signal 13, a picture control signal 14, and an enable signal 29 for a location circuit acting to provide a location signal 20 indicative of the location of the infra-red emitting tag in the field of view of sensor 8. Signals 14, 15' and 20 are supplied to the image analysis and decision circuit 19 for enabling a memory to store selected portions of the signal 15' together with the ancillary information signal 13. As in FIG. 2 circuit 19 acts on the signals 14, 15' and 20 to determine if and when a suitable picture is available whereupon it issues an enable signal 37 to a memory 36 for recording a visible video signal 35 together with ancillary signal 13. The video signal 35 could be the same as signal 15', but as shown the circuit 19 further acts to couple an image select signal 33 to an image select circuit 34 for providing the signal 35. Circuit 34 acts to extract a selected portion of the field of view represented by signal 35 to constitute signal 35, thereby effectively acting as a pan, tilt and/or zoom control for the fixed sensor 9. Image degradation can be avoided by the use of a very high density sensor 9.

The embodiments of FIGS. 1 to 3 include a camera 2 in which the CCD array 9 comprises a conventional multi-colour array (commonly RGB) of sensors arranged to be read for simultaneous colour component signals. In such an array, individual sensors receive light through an appropriate filter, or are otherwise arranged to sense only one colour component, and the sets of sensors for each colour component are regularly distributed throughout the entire array. Sensor arrays are also known in which each individual sensor provides a plurality of colour (e.g. RGB) signals simultaneously—see for example U.S. Pat. No. 5,965,875 to Foveon. Alternatively, array 9 could be a monochrome array without colour filters for "black and white" pictures.

With some colour sensor arrays, it is possible to read out the sensors for one colour component at a time, to provide a colour sequential signal (three sequential colour planes). This is presently easier for CMOS arrays than CCD arrays.

In an alternative embodiment, for use with a passive infrared target 1 which bears a pattern or spatial encoding for further transmission of information to the camera., the array 8 is an infra-red sensitive array having similar or equal pixel numbers to the sensors for each colour component. The array 8 may then be initially scanned at a relatively slow frame rate, that pertaining to the array 9, until the presence and position of the target is sensed. Thereafter the array area which is scanned is restricted to that immediately containing the target, so that it can thereafter be read at the relatively high rate and the coded information retrieved, the area of the array 8 thus scanned being indicative of the target location. To avoid loss of information the locally scanned area should be sufficient to permit tracking of the target position. An advantage of this embodiment is that the resolution of the target at the array 8 is improved relative to the relatively sparse sensor 8 of FIG. 2.

Figure 4:
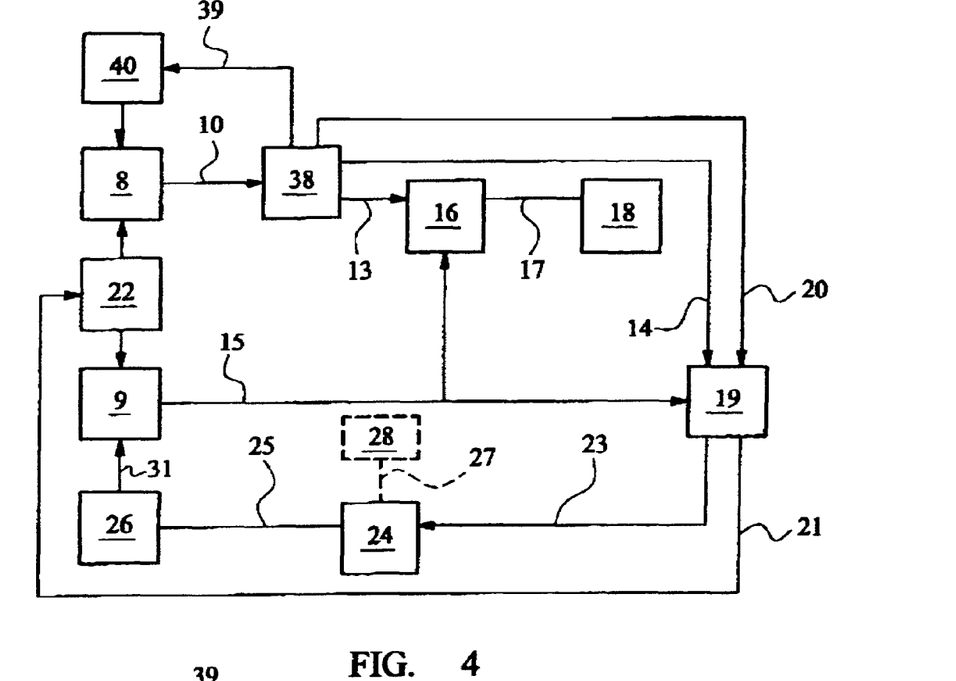
FIG. 4 shows in schematic block diagram form the circuitry of a third embodiment of the invention.

An arrangement for doing this is illustrated in FIG. 4 where the output of sensor 8 is passed to an image analysis circuit 38 for detecting and reading the passive target. The sensor 8 has a number of sensors comparable to the pixel size of sensor 9, and is scanned at a like rate until the circuit 38 detects the presence and position of the target 1 and produces an output 39 to a scan control circuit 40. The latter acts to reduce the area of sensor 8 which is scanned, generally centred on the target, while optionally increasing the scan rate to facilitate the reading of target 1 by the circuit 38. In response thereto circuit 38 then provides a target location signal 40, a picture control signal 14 and an ancillary information signal 13, the latter being combined with the output of visible sensor 9 in a combiner 16 for storage in memory 18. Visible signal 15 is coupled together with signals 14 and 20 to the image analysis and decision circuit 19 for control of servos 22 (signal 21) and for production of the control signal 23 as before. Again, active control of the scanned reduced area of sensor 8 is necessary in view of the somewhat independent control of pan, zoom and/or tilt by the servos 22 in response to the requirements of the picture control signal 14.

Figure 5:
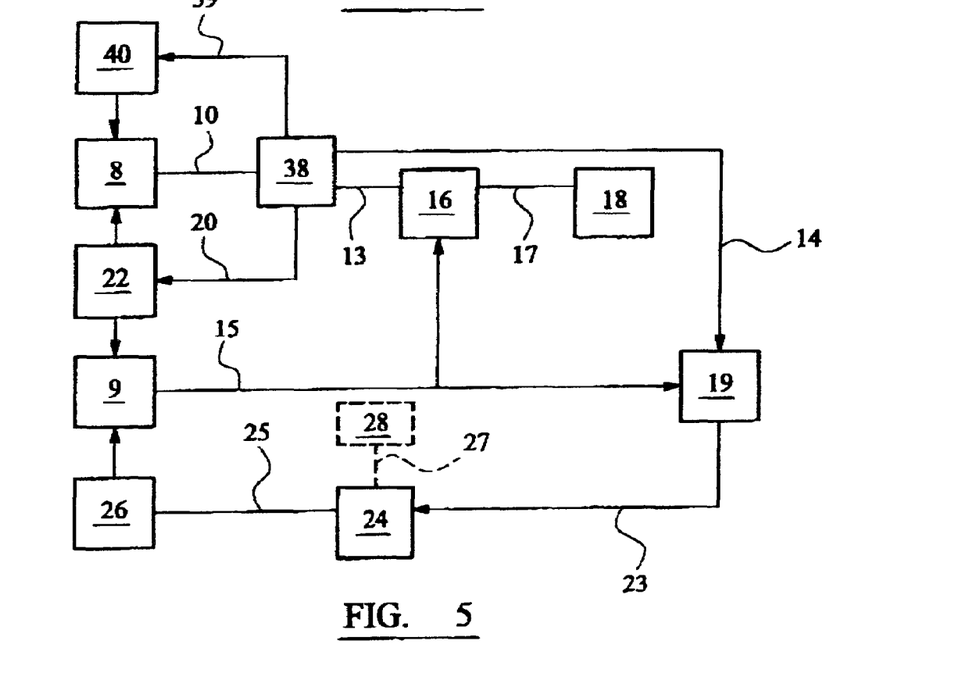
FIG. 5 shows in schematic block diagram form the circuitry of a fourth embodiment of the invention.

In FIG. 5, in which the upper part of the drawing is generally similar to that of FIG. 4, the camera servos 22 receive the location signal 20 instead of the output from the image analysis circuit 19, so that the target is tracked and its position has a generally fixed relation to the visible and infra-red fields. It is then necessary only to feed signals 14 and 15 to analysis circuit 19, since the position of the target is known, and the output of circuit 19 in this case is merely the control signal 23 for timing. Furthermore, the signal 39 in this case merely serves to reduce the scanned area to the central portion of sensor 40 where the target image should lie.

Figure 6:
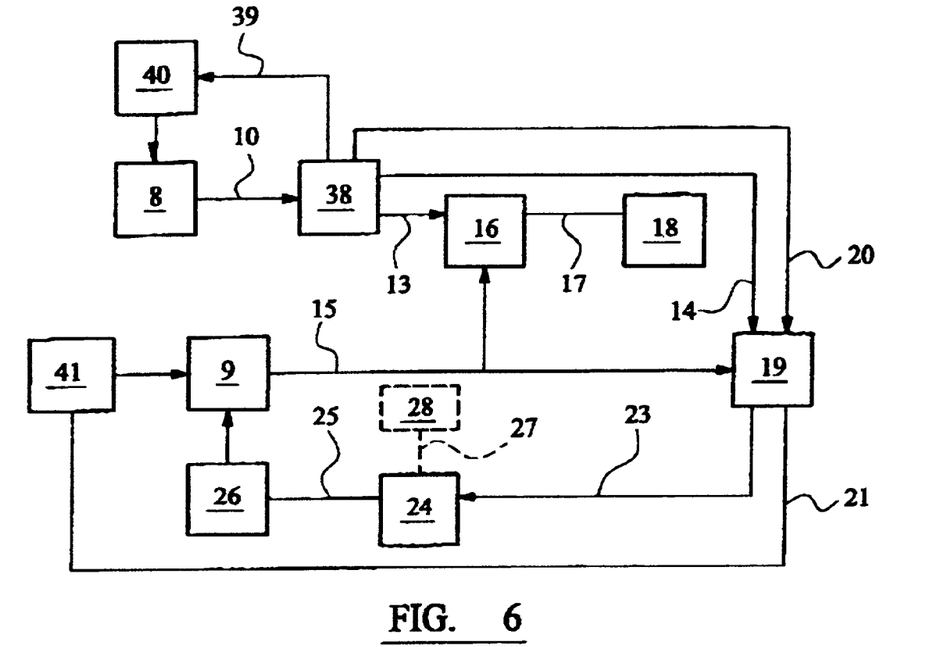
FIG. 6 shows in schematic block diagram form the circuitry of a fifth embodiment of the invention.

In FIG. 6, which is a modification of FIG. 5, the sensors 8, 9 are again both relatively high resolution with a wide field of view, but servos 22 are omitted, being effectively substituted by the scan control circuit 40 and a further visible scan control circuit 41 controlling sensor 9. In this embodiment, the setting control signal 21 from analysis circuit 19 is coupled to the scan control circuit for adjusting the area (zoom) and position of the area (pan and tilt) of sensor 9 which is scanned for providing signal 15. It should be noted that in this case, the reduced area of scan in sensor 8 and a reduced area of scan in sensor 9 may or may not (a) be the same; (b) have a limited overlap; or (c) fall entirely one within the other.

In the foregoing embodiments the sensors 8 and 9 have a fixed spatial relation to each other. It is to be noted that separate sensors 8 and 9 could be employed with individual pan/tilt/zoom control, provided means are provided for ensuring that their maximum fields of view at least partially overlap.

In the embodiments thus far described, the array 9 may be replaced by a 3-way beamsplitter and three corresponding sensor arrays in known fashion. Filters at the three sensor arrays may or may not be necessary depending on whether the beamsplitter provides appropriate colour component selection. There is an advantage in that the focus at each array may be matched more accurately to the colour component in question. Alternatively three filters may be switched or mechanically moved in turn in front of a single monochrome array 9 to provide a colour sequential signal in known fashion.

As shown, the arrays 8 and 9 are spatially separate, and this is advantageous in that the focus at the array 8 may be adjusted for the infra-red waveband being used. However, it is possible for the infra-red sensors to be part of the array 9. For example, they may have the same density as the colour sensors, i.e. one for each RGB triad, or a lower density, and in either case they will be regularly dispersed over the array area, but will be read separately. Where they are less dense, they correspond closely to the array 8 of FIG. 1, and are read out separately from the colour sensors at the relatively high frame rate. Where they are of the same order of density, they will be operated as in the modification shown in FIG. 3—the low frame scanning rate may be independent of, or incorporated into, the frame scanning of the colour sensors, but the high frame rate will conveniently be independent of the colour sensor scanning.

Where the infra-red array is combined with array 9, it is also possible to use a four-filter arrangement for passing RGB and IR in sequence to the array for a colour sequential arrangement. The timing of the IR filter may need to be adjusted to ensure that rapid and repeated IR frame scanning can still be achieved as required. It may also be possible to use the type of array disclosed in Foveon mentioned previously for providing both signals 10, 15 simultaneously.

The target 1 in FIG. 1 may be arranged to emit its signal continuously or at regular intervals. However, this is relatively energy hungry, and could lead to premature termination of its function. It is possible to arrange that the camera emits an interrogation signal, again continuously or periodically, to wake up a "sleeping" target, i.e. in an energy saving mode, which can then transmit a signal to the camera. Another arrangement involves illumination of the scene with infra-red light and the provision of a passive target, which responds preferentially to the infra-red light in a way which can be recognised by the camera. In such a case, the target will still provide a location indication, but any additional information will need to be provided, for example, by patterning or other spatial coding on the target.

Figure 7:
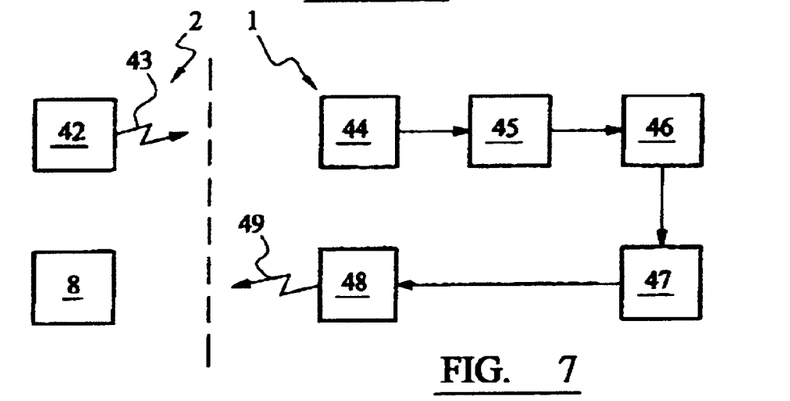
FIG. 7 illustrates in schematic form an embodiment in which the target has "sleep" circuitry.

FIG. 7 shows such an arrangement, in which a transmitter 42 on the camera periodically emits an interrogation signal 43. Signal 43 could take any form, including an optical, radio or acoustic signal. The output from a corresponding sensor 44 on the target 1 is coupled to an interrogation recognition circuit 45 so that when a camera signal 43 is detected it output a signal to a power-up circuit 46 controlling the supply of power to the rest of the target circuit, which is normally turned off (sleep mode) but is turned on in the presence of signal 43. In particular, a target signal generating circuit 47 is activated to provide an encoded modulated target signal for supply to an infra-red emitter 48, the resulting infra-red target signal 49 being detected by the sensor array 9 of the camera 2.

It will be recognised that the ability to communicate between a camera and a tag means that ancillary functions are possible. For example, a tag may respond only to cameras emitting an appropriate authentication signal, a camera might be able selectively to address one of a plurality of tags in the locality, or a camera might be enabled to write to the tag to change information stored in the tag. Selective communication between cameras and tags may be established, which could prove useful where there are a plurality of tags and/or cameras in the same locality.

While reference has been made above to exposure control, and to a camera setting control, for the visible camera, similar controls may be adopted for the infra-red sensor as necessary or as desired. In particular focus may need to be controlled when a passive tag needs to be read.

Thus far, attention has been paid to the provision of targets for automated camera operation. However, the camera according to the invention can also be used to provide images with improved colour rendition, whether or not operation is in response to the presence of a target.

The filters used in colour sensor arrays are not ideal, and as is well known the response of a sensor does not match that of a human eye. A particular problem with some sensor arrays is that non-visible components of the spectrum actually produce a sensor output and so alter the apparent colour as viewed in the resulting image. It is well known to provide a UV filter to deal with the more energetic end of the spectrum, but IR can also interfere, particularly with the sensors for red. The array 8, whether providing a low resolution image as in FIGS. 1 and 2, or providing a high resolution image as in FIG. 3, and whether separate from the array 9 as in FIGS. 1 to 6 or incorporated with the array 9, can provide an IR image of use in its own right. Provided that the amount of the IR contribution to the visible sensor outputs is known, this image can be used to correct them by substantially eliminate such contribution, for example by simple linear combinations of adjacent or nearby IR and visible sensors. Where the IR image is of low resolution, some form of averaging or interpolation over the pixel field may be necessary.

Figure 8:
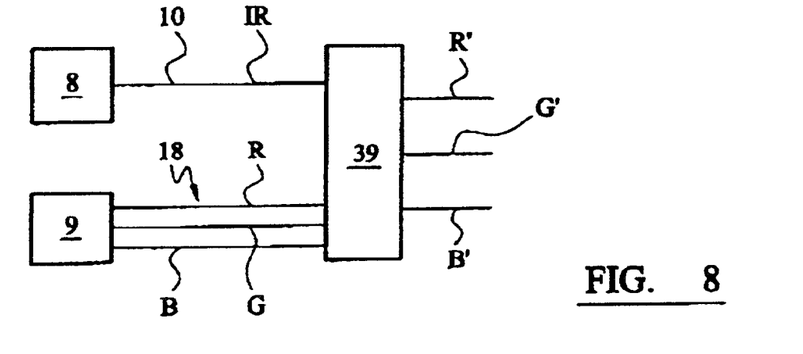
FIG. 8 illustrates in schematic form an embodiment for correcting colour signals.

FIG. 8 shows an embodiment in which the output 18 of sensor 9 is in the form of separate R, G and B outputs, which are fed to a matrix circuit 39 together with the IR output 10 of the infra-red sensor 8. For convenience it will be assumed that the sensors 8 and 9 have the same resolution, but the reader will understand that it is possible to adjust one or other of the two signals so that they have the same resolution, for example by interpolation between pixels (e.g. of a low resolution signal 10) or averaging over pixels (e.g. of a high resolution signal 18). The matrix circuit effects a combination:

$$C' = a_{CR}(R) + a_{CB}(B) + a_{CG}(G) + a_{CIR}(IR)$$

where C is the colour to be corrected and C1 is the corrected output, shown as R', G' and B' in FIG. 7. The factors a may be constant or variable, and may represent multipliers or other functions of the signals R, G and B. For a linear combination, factors a are constant for multiplication by the signals R, G and B. A variable multiplication factor a may itself be determined by the values of R, G and B, and might be necessary if for example the susceptibility of a sensor to infra-red was dependent on the accumulated exposure thereto. If desired or appropriate not all visible colours may be corrected, and clearly a further corrected infra-red output could be provided if desired.

The invention claimed is:

1. Camera apparatus comprising a digital camera arrangement arranged to provide a first image signal corresponding to an infra-red field of view and a second image signal corresponding to a visible field of view, wherein said visible and infra-red fields of view overlap or share a common field of view, and said apparatus includes a signal combiner for combining the second image signal with information from the first image signal and a signal analyser for analysing said first signal for detecting and determining the location of an infra-red target within the field of view of the camera apparatus, the signal analyzer being arranged to derive a target location signal indicative of the location of the infra-red target included in the first image signal, and further including circuitry connected to be responsive to information in the first image signal for deriving a picture control signal, the signal combiner being arranged to be responsive to (a) the target location signal, (b) the picture control signal, and (c) the second image signal for deriving at least one desired parameter for a detector arrangement for the visible field of view of the camera.

2. Camera apparatus according to claim 1 for use with a target or an optical pointer for emitting modulated infra-red light bearing information, said camera apparatus being provided with a modulated light detector for responding to said modulated light to provide an information signal.

3. Camera apparatus according to claim 1 for use with a target which bears information in the form of an infra-red light pattern or coding, said camera apparatus being provided with a pattern detector for responding to said pattern or coding to provide an information signal.

4. Camera apparatus according to claim 2 wherein the signal combiner is arranged for combining at least part of said information signal with the second signal to provide a composite output signal.

5. Camera apparatus according to claim 4 wherein said signal combiner is arranged for carrying the output signal to provide an image corresponding to the second signal modified in that said at least part of said information signal underlies the image as in a web page or windows application.

6. Camera apparatus according to claim 1 and including an adaptive image signal responsive circuit for (a) receiving a said image signal and, in response thereto, (b) controlling at least one of (i) the camera and (ii) the selection of a selected picture signal from the said image signal.

7. Camera apparatus according to claim 6 wherein said adaptive circuit is arranged for control of the timing of operation of the camera.

8. Camera apparatus according to claim 6 wherein said adaptive circuit is arranged for control of at least one of camera pan, tilt and zoom.

9. Camera apparatus according to claim 6 wherein said adaptive circuit is arranged to be responsive to the target location.

10. Camera apparatus according to claim 1 and provided with a controller for responding to said target location for controlling at least one of camera tilt, pan and zoom.

11. Camera apparatus according to claim 1 and including a first sensor which is infra-red sensitive for providing said first image signal, and is also sensitive to visible light, for providing said second signal, the apparatus also including at least one infra-red and one visible filter, and a filter switcher for switching or placing said filters before the single sensor in sequence to provide said first and second signals.

12. Camera apparatus according to claim 1 and including a first sensor which is infra-red sensitive for providing said first image signal and a spatially separate second sensor which is visible light sensitive for providing said second image signal.

13. Camera apparatus according to claim 1 wherein the first and second signals are provided by first and second image sensors respectively, the first image sensor comprising a first infra-red sensitive sensor element array for providing a first plurality of pixels and the second image sensor comprising one or more second element visible light sensitive sensor arrays for providing a second plurality of pixels, the first and second sensor element arrays being combined into a single composite sensor element array.

14. Camera apparatus according to claim 13 wherein the first plurality of pixels is substantially less than the second plurality of pixels.

15. Camera apparatus according to claim 14 and including an arrangement for scanning the first and second arrays at respective first and second array rates, wherein the first rate is substantially greater than the second rate.

16. Camera apparatus according to claim 15 wherein said increased rate is at least 300 frames per second.

17. Camera apparatus according to claim 1 wherein the first signal is provided by a first sensor, and including a scan control for selectively restricting the area of the first sensor which is scanned.

18. Camera apparatus according to claim 17 wherein the scan control is responsive to said target location for determining said restricted area.

19. Camera apparatus according to claim 17 and including a rate selective circuit for selectively controlling whether the whole of the first sensor is scanned at a first sensor rate or whether the restricted area is scanned at a substantially increased rate.

20. Camera apparatus according to claim 18 wherein said increased rate is at least 300 frames per second.

21. Camera apparatus according to claim 1 wherein the signal combiner for combining the second image signal with information from the first image signal is arranged for correcting for sensitivity of the first image signal to infra-red light.

22. A camera system comprising camera apparatus as claimed in claim 1 and at least one target or optical pointer providing an infra-red image.

23. A system according to claim 22 wherein said target or optical pointer is arranged to emit modulated infra-red light.

24. A system according to claim 23 wherein said modulated light carries an information signal.

25. A system according to claim 24 wherein said information signal includes an address or other identifier relating to the target or pointer user.

26. A system according to claim 24 wherein said information signal includes instructions for camera control.

27. Camera apparatus according to claim 1 wherein the signal combiner for combining the second image signal with information from the first image signal is arranged for correcting for sensitivity of the second image signal to visible light.

28. Camera apparatus according to claim 27 wherein the signal combiner for combining the second image signal with information from the first image signal is arranged for correcting for sensitivity of the first image signal to infra-red light.

29. Camera apparatus according to claim 1 wherein the at least one desired parameter includes the amount of optical energy preferably incident on the detector arrangement.

30. Camera apparatus according to claim 29 wherein the at least one desired parameter also includes a desired field of view of the detector arrangement.

31. Camera apparatus according to claim 1 wherein the at least one desired parameter includes a desired field of view of the detector arrangement.

* * * * *